(12) United States Patent
Lunden et al.

(10) Patent No.: US 10,368,393 B2
(45) Date of Patent: Jul. 30, 2019

(54) METHODS AND APPARATUSES FOR ENHANCING THE SETUP OF CARRIER AGGREGATION, DUAL CONNECTIVITY, MULTI CONNECTIVITY, LICENSE ASSISTED ACCESS, OR LTE-WLAN IN COMMUNICATIONS NETWORKS

(71) Applicant: Nokia Technologies Oy, Espoo (FI)

(72) Inventors: Jari Petteri Lunden, Espoo (FI); Elena Virtej, Espoo (FI); Lars Dalsgaard, Oulu (FI); Tero Henttonen, Espoo (FI); Sari Kaarina Nielsen, Espoo (FI); Esa Mikael Malkamäki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 72 days.

(21) Appl. No.: 15/615,354

(22) Filed: Jun. 6, 2017

(65) Prior Publication Data
US 2017/0359747 A1    Dec. 14, 2017

Related U.S. Application Data

(60) Provisional application No. 62/348,363, filed on Jun. 10, 2016.

(51) Int. Cl.
*H04W 4/00* (2018.01)
*H04W 88/06* (2009.01)
(Continued)

(52) U.S. Cl.
CPC .......... *H04W 88/06* (2013.01); *H04L 5/0098* (2013.01); *H04L 27/2613* (2013.01);
(Continued)

(58) Field of Classification Search
CPC ... H04W 88/06; H04W 76/16; H04W 5/0098; H04W 27/2613; H04W 24/00; H04W 48/14
(Continued)

(56) References Cited

U.S. PATENT DOCUMENTS

2011/0237202 A1* 9/2011 Uemura ............ H04W 36/0088
455/67.14
2013/0046821 A1* 2/2013 Alanara ............ H04W 52/0216
709/204
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, pp. 1-551.

*Primary Examiner* — Sai Ming Chan
(74) *Attorney, Agent, or Firm* — Squire Patton Boggs (US) LLP

(57) ABSTRACT

Systems, methods, apparatuses, and computer program products for enhancing the setup of carrier aggregation (or dual connectivity or multi connectivity or stand-alone LTE/LTE-like on unlicensed band or LAA or LTE-WLAN aggregation) from IDLE mode (or semi-idle or semi-connected or suspended state) are provided. One method includes providing an indication, to at least one UE, of (or configuring the UE with) potential inter-frequency carriers that the UE should measure during IDLE mode (or during semi-idle or semi-connected or suspended state) for potential SCells. The method may further include during or after RRC connection establishment, receiving an indication from the at least one UE that it has inter-frequency carrier(s) and/or SCell measurement results available, and based on the received measurement results, configuring carrier aggregation (or dual connectivity or multi connectivity or LAA or LTE-WLAN
(Continued)

aggregation) without further measurements and activating the SCell.

20 Claims, 8 Drawing Sheets

(51) Int. Cl.
*H04W 48/14* (2009.01)
*H04L 27/26* (2006.01)
*H04L 5/00* (2006.01)
*H04W 24/00* (2009.01)
*H04W 76/16* (2018.01)
*H04W 16/14* (2009.01)

(52) U.S. Cl.
CPC .......... *H04W 24/00* (2013.01); *H04W 48/14* (2013.01); *H04W 76/16* (2018.02); *H04W 16/14* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0288664 A1* | 10/2013 | Bodog | H04W 24/00 455/422.1 |
| 2016/0205591 A1* | 7/2016 | Hong | H04W 40/02 370/235 |
| 2017/0318606 A1* | 11/2017 | Lee | H04L 67/12 |

* cited by examiner

METHODS AND APPARATUSES FOR ENHANCING THE SETUP OF CARRIER AGGREGATION, DUAL CONNECTIVITY, MULTI CONNECTIVITY, LICENSE ASSISTED ACCESS, OR LTE-WLAN IN COMMUNICATIONS NETWORKS

BACKGROUND

Field

Certain embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), and/or 5G radio access technology. Some embodiments may relate to methods and apparatuses for enhancing the setup of carrier aggregation, dual connectivity, multi connectivity, license assisted access (LAA), LTE-WLAN aggregation, or stand-alone LTE/LTE-like on unlicensed band, etc., in communications networks, such as LTE.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

BRIEF DESCRIPTION OF THE DRAWINGS

For proper understanding of the invention, reference should be made to the accompanying drawings, wherein.

DETAILED DESCRIPTION

Figure 1:
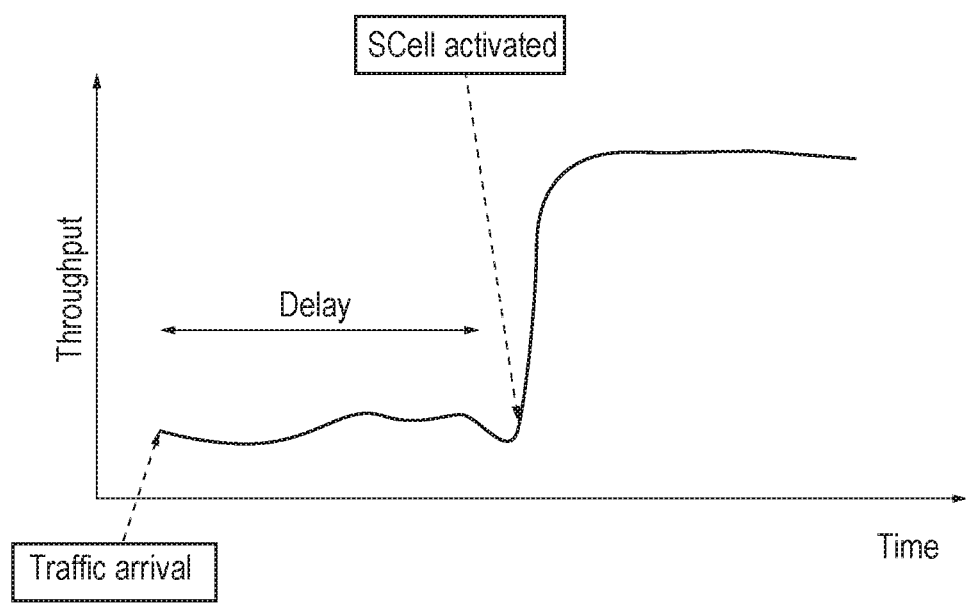
FIG. 1 illustrates an example of a graph depicting the problem of lower throughput and increased latency.

It will be readily understood that the components of the invention, as generally described and illustrated in the figures herein, may be arranged and designed in a wide variety of different configurations. Thus, the following detailed description of embodiments of systems, methods, apparatuses, and computer program products for enhancing the setup of carrier aggregation, dual connectivity, multi connectivity, LAA, stand-alone LTE/LTE-like on unlicensed band or LTE-WLAN aggregation, from IDLE mode (or semi-idle, semi-connected, or suspended mode), as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Based on today's typical smart phone traffic profile with always on applications, there are packet calls occurring regularly (i.e., every few minutes or so) and most of those packet calls have only a small amount of data (e.g., few hundred kilobytes). In current LTE networks, the UEs are frequently transitioned between radio resource control (RRC) connected and IDLE states in between consecutive packet calls. The reason for the network operating this way instead of keeping a UE in the connected mode for longer periods of time is to drive down the UE power consumption. Compared to configuring a UE with connected mode discontinuous reception (DRX) and keeping the connection for a longer time, there is the additional benefit that the amount of handover (HO) signaling is reduced.

The result of this approach is that carrier aggregation (CA) has to be configured and activated again for practically every packet call. This causes significant delay (in the order of hundreds of milliseconds to several seconds) due to the measurements, reporting, configuration and activation delays associated with setting up the CA. This delay leads to lower CA utilization and thus lower network performance and efficiency. This is also noticed by the end user as lower throughput and increased latency, which can also mean longer active time and therefore higher power consumption.

FIG. 1 illustrates an example graph depicting the problem outlined above with respect to carrier aggregation (CA). The delay in setting up the CA and getting a secondary cell (SCell) activated means that the UE is initially served only in the macro cell with low throughput. This is a problem for both the network (e.g., congested macro as offloading traffic is slow) and the UE (e.g., user experiences lower throughput).

In addition to carrier aggregation, certain embodiments of the invention can also be applied more generally to other scenarios, where a UE may be potentially served by cells on different channels or frequencies. Typically, this may be a case where the secondary cell (SCell) is a small cell and not sharing the same coverage with the primary cell (PCell), but also other scenarios in which aggregation of multiple cells or frequencies are possible.

One such scenario is dual connectivity (DC), for example. In contrast to CA where the same eNB is controlling both primary cell (PCell) and one or more secondary cells (SCell), in DC, the UE is connected to two different eNBs simultaneously, i.e., a master eNB (MeNB, typically a macro cell) and secondary eNB (SeNB, typically a small cell). The MeNB and SeNB operate on different carriers. Certain embodiments of the invention can be applied in the DC scenario to enhance the setup of dual connectivity (i.e., addition and configuration of SeNB) after RRC connection establishment, as the measurement information is available and signaled from the UE to the network sooner.

In addition to CA and DC, certain embodiments of the invention can be applied to other similar setups, such as LTE-WLAN aggregation (where UE has connections to different radio access technology cells, and the setup of WLAN connection can be enhanced to take place faster), Multi Connectivity (UE is connected to cells of both LTE and 5G technology), Licensed Assisted Access or standalone LTE-like system on unlicensed spectrum (for example MulteFire). Stand-alone LTE-U (LTE unlicensed) can be understood to refer to a LTE based system operating on unlicensed carrier without a supporting connection on a licensed carrier. Thus, LTE standalone operation on unlicensed spectrum would mean that eNB/UE air interface rely solely on unlicensed spectrum without any need for a carrier on licensed spectrum. Basically, the same principles can be applied to deployment of LTE or similar licensed system in unlicensed frequency domain where access (by eNB, UE or other device) is not guaranteed in a similar robust way as would be expected in the licensed domain.

Additionally, it should be noted that certain embodiments of the invention are not limited to the case where UE is coming from IDLE to RRC connected state. For example, some embodiments may also be applied in the case there is another state for example between IDLE and connected states, such as for instance a semi-idle or semi-connected state or a suspended state, where the connection is not released but is suspended. In such a case, the invention can also be applied when UE is moving from another state to the connected state, i.e., the signaling of measurement information takes place after or during this transition. A key point is that, according to certain embodiments, the setup (including, for example, configuration and activation) of the secondary cell or connection can be made sooner after the primary cell or connection is established or resumed. In one embodiment, this is accomplished by configuring UE to perform measurements of the (potential) secondary cell carrier when not in the connected state and signaling results of these measurements when entering the connected state, as will be discussed in detail below.

Figure 2A:
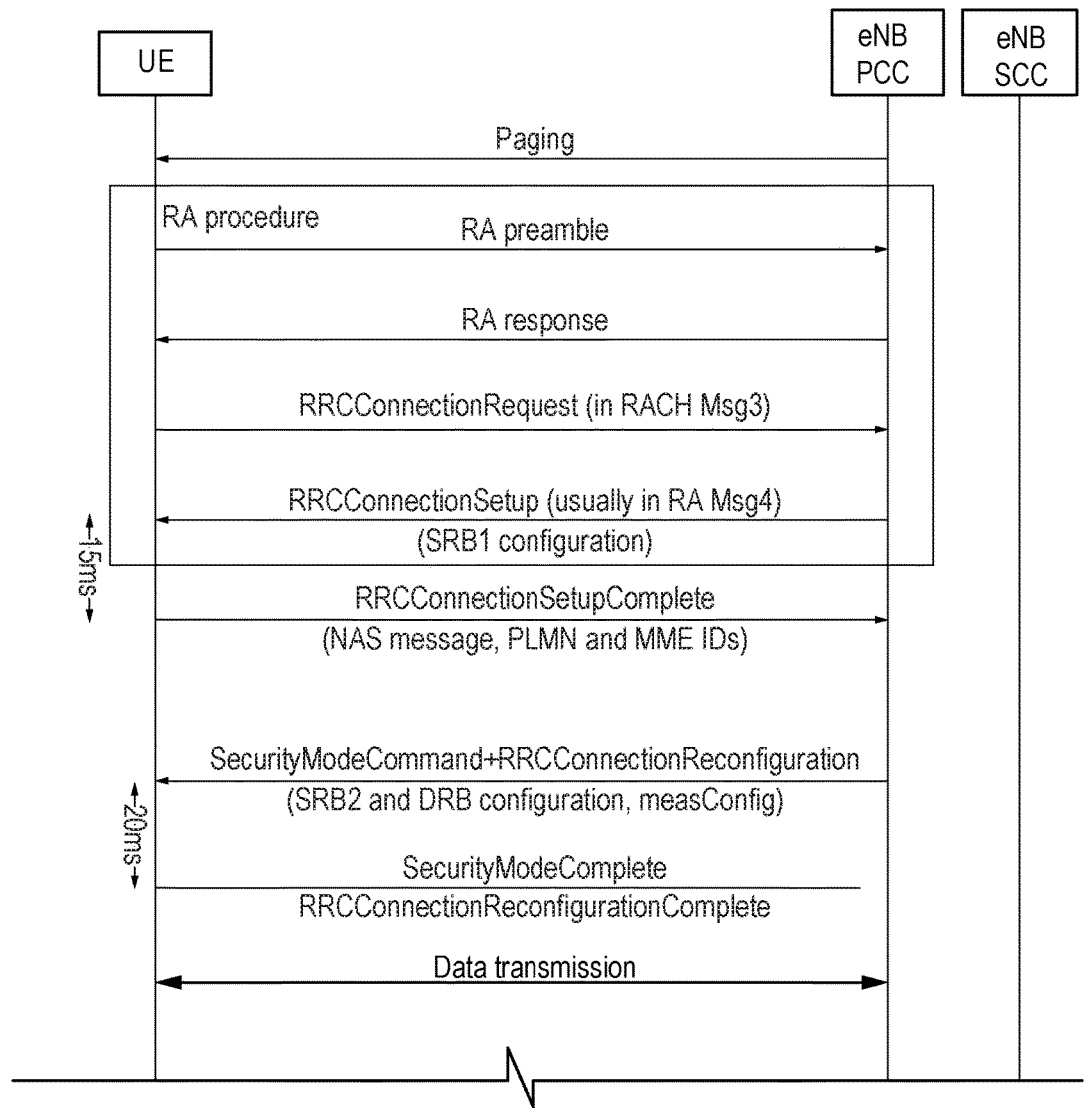
FIG. 2A and FIG. 2B illustrate legacy behavior of RRC connection setup and RRC connection reconfiguration to configure SCells according to current LTE standards.
Figure 2B:
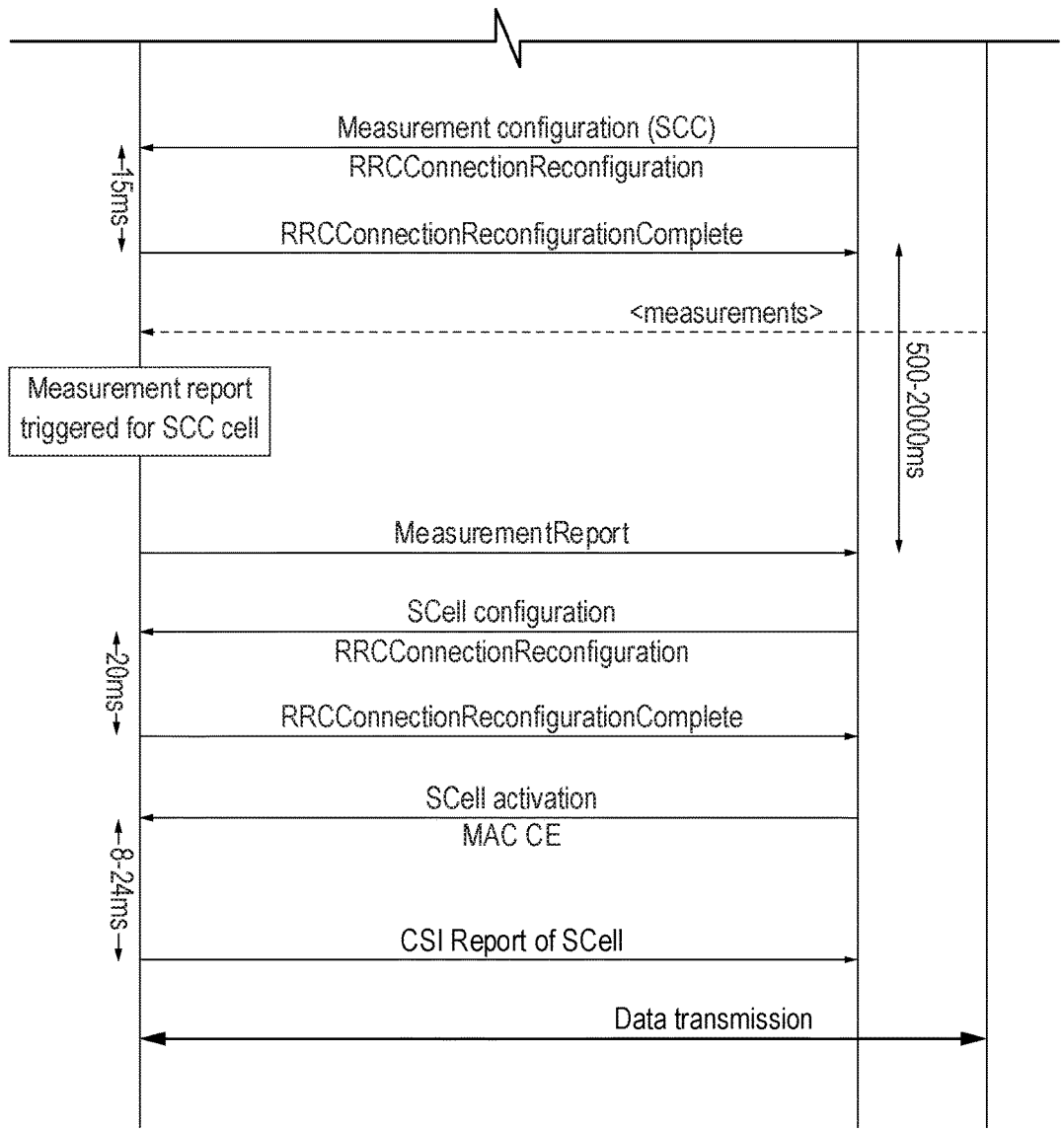

FIG. 2A and FIG. 2B illustrate legacy behavior of RRC connection setup and RRC connection reconfiguration to configure SCells according to the current LTE standards. As illustrated in FIG. 2A and FIG. 2B, the data transmission process in current LTE standard starts either with paging (mobile terminated) or with random access (mobile originated). After RRCConnectionSetupComplete message, the eNB contacts a mobility management entity (MME) to obtain, for example, security keys. After that, SecurityModeCommand message (together with RRCConnectionReconfiguration message) is sent to the UE to initiate the security (both user plane and control plane). After receiving SecurityModeComplete message from the UE, data transmission between the UE and primary cell (PCell) can be started. If the network wants to use carrier aggregation, i.e., configure secondary cells (SCells), it has to setup SCell measurements, and the network has to configure additional measurements, i.e., send RRCConnectionReconfiguration message with SCell measurement configuration. Then, the UE performs measurements trying to find suitable SCells. The measurements are inter-frequency measurements and therefore the minimum measurement period is 480 ms. Thus, the UE can report first measurement results after about 500 ms. If more than 1 inter-frequency carriers are configured for measurements, then the measurement period is even longer. After receiving the measurement report, the eNB can configure one or more SCells with RRCConnectionReconfiguration message. After configuration, SCells are always deactivated and have to be activated with medium access control (MAC) signalling (Activation MAC control element (CE)). Once the SCell is activated, data transmission over the SCell can be started.

One embodiment is directed to indicating to a UE which "CA profile" the UE should use when establishing a packet call. In certain embodiments, the "CA profile" may be indicated in either the connection setup message, or may be pre-configured to the UE prior to the establishment attempt via dedicated (i.e., within previous RRC connection) or broadcast signaling (e.g., within system information). An aim of certain embodiments of the invention is to have the CA running faster after RRC connection establishment, to the extent possible.

Figure 3:
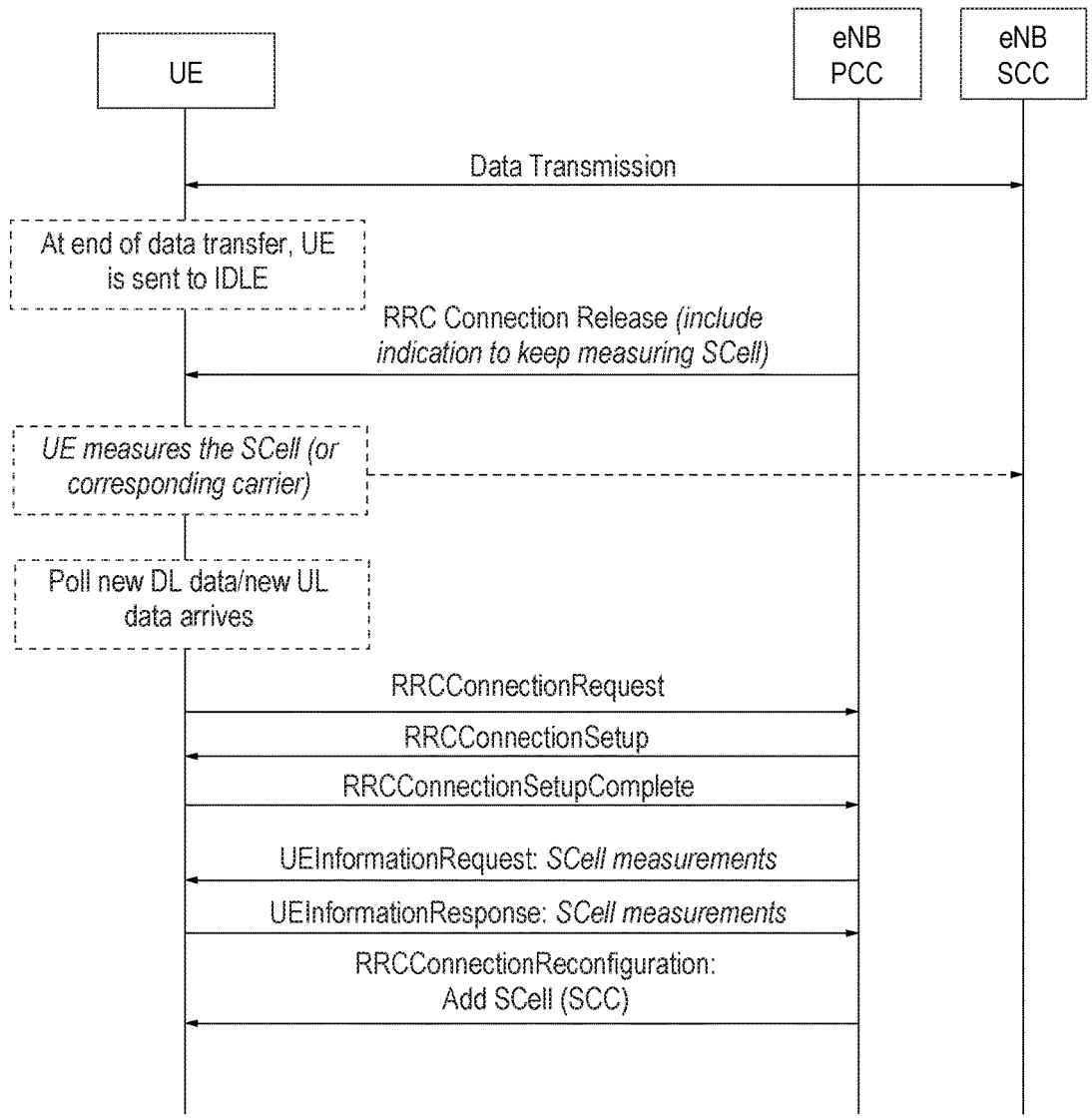
FIG. 3 illustrates an example signaling flow diagram, according to an embodiment of the invention.

FIG. 3 illustrates an example signaling flow diagram, according to an embodiment of the invention. In certain embodiments, the SCell measurements, which make up most of the delay in getting the CA in use, are "moved to IDLE mode" in order to take place before the connection is established, as much as it is possible.

According to one embodiment, a UE is configured/indicated with potential inter-frequency carriers it should measure during the IDLE mode (may be with relaxed performance or best effort) for potential SCells. These potential inter-frequency carriers may be provided to the UE according to several possible alternatives. For example, in one embodiment, dedicated signaling in previous RRC connection may be used; for example, the UE may store the profile and use it for pre-determined time or until certain conditions are fulfilled. In one embodiment, these measurements are performed for a predetermined time (e.g., few minutes or tens of seconds), duration of which could be indicated in the signaling from the network. Alternatively, in another embodiment, broadcast signaling may be used where the serving cells indicate which CA profiles are allowed within the cell.

During or after the RRC connection establishment, the UE may indicate if it has inter-frequency/SCell measurement results available (relying on IDLE mode measurements). This indication (or measurements results report) may be provided within the establishment message, or may be provided after the establishment message. For instance, in certain embodiments, the indication of measurement results may be an implicit reference to existing profiles or an explicit indication of which parameters the UE wishes to use.

Then, based on the received information, the network may immediately configure CA without further measurements. This can be an activation of a profile, or explicitly signaling the parameters as part of normal connection setup. Since the measurements are the most time consuming part of setting up the CA, embodiments of the invention can significantly improve the CA utilization rate and efficiency.

According to another embodiment, the UE may indicate if the previously configured SCell(s) is still available. The UE may store or keep some information of the SCell(s) and measure also during the IDLE mode. This may also be configured or indicated at connection release.

According to certain embodiments, the signalling of the SCell measurement information from during IDLE mode may be arranged as part of establishment signalling (e.g., within RRCConnectionRequest via an establishment cause or within RRCConnectionSetupComplete via a new indication), or as part of UE information procedure (UEInformationRequest and UEInformationResponse messaging) after the RRC connection has been established.

According to an embodiment, in the measurement result report of these additional idle mode SCell measurements, the UE may at least indicate what cells (ID e.g., PCID) it has been able to identify on the carrier frequency or frequencies indicated for these measurements. Optionally, the UE may also report level measurements like reference signal received power (RSRP) or reference signal received quality (RSRQ) measurement results for these identified cells, but these level measurements may not be necessary especially if the uplink (UL) signaling would like to be reduced.

In addition, according to an embodiment, the UE may need to be indicated which inter-frequency carrier(s) it should be measuring during the IDLE mode for potential SCells. This may be separated from the carriers the UE searches/measures for cell selection or reselection, so new signaling may be needed. In an embodiment, there may be dedicated signaling before the UE's RRC connection is released, or an alternative would be to include this in the system information broadcast. Furthermore, according to some embodiments, these additional UE idle mode measurements may be optional for CA capable UEs in order to avoid setting any further constraints for non-CA capable UEs or any low cost or low power consumption UEs. Also, since these additional idle mode measurements are not used for mobility support such as cell reselections, they can be best effort since accuracy and how recently measurements have been performed are not absolutely critical. Importantly, it is that the UE has recently detected the given cell and, therefore, immediate configuration of this cell as SCell for CA can be done by the network. This would results in shorter delays in SCell configuration and therefore faster usages of CA for data transmission.

Figure 4:
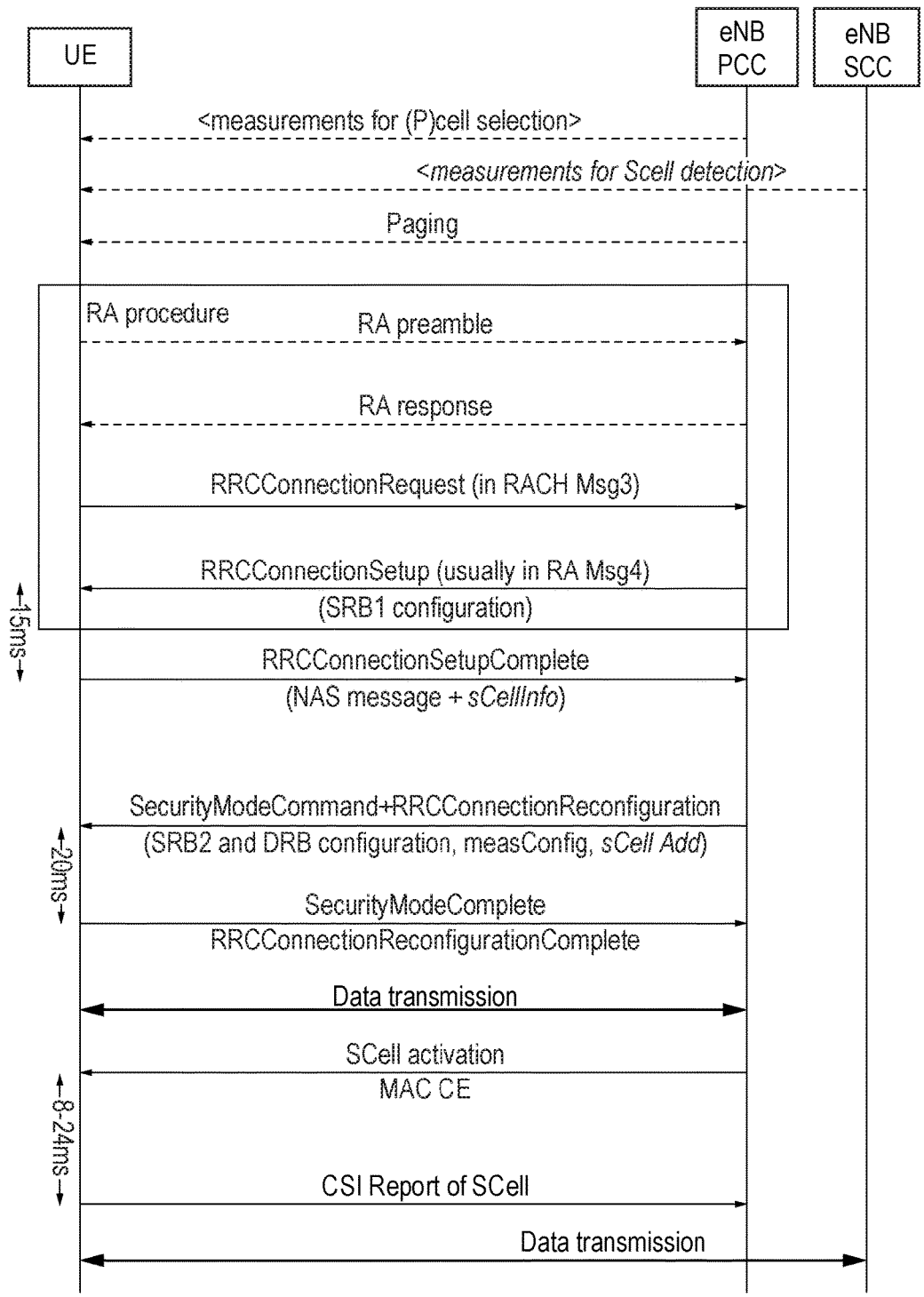
FIG. 4 illustrates another example of a signaling flow diagram, according to an embodiment.

FIG. 4 illustrates another example of a signaling flow diagram, according to an embodiment. In particular, FIG. 4 illustrates a RRC Connection Setup and SCell configuration, according to one embodiment of the invention. Here, measurements of SCell frequencies are done already during the IDLE mode. When data arrives, the network sends paging (mobile terminated) or the UE sends random access (mobile originated). In this embodiment, the UE can provide SCell measurement results and/or suggestion for SCell configuration already in RRCConnectionSetupComplete message (sCellInfo). Thus, the first RRCConnectionReconfiguration message sent together with SecurityModeCommand message may contain SCell configuration (SCell Add) which significantly speeds up the SCell configuration process. In this case, data transmission in SCell can start almost at the same time as in PCell, SCells have to be activated by sending Activation MAC CE. After receiving the first channel state information (CSI) report for the SCell, data transmission through SCell can be started. The major savings comes from measurements during IDLE mode, i.e., there is no need to perform inter-frequency measurements in CONNECTED mode, but instead SCells can be configured immediately. As an example, more than 500 ms delay may be saved compared to legacy.

Figure 5:
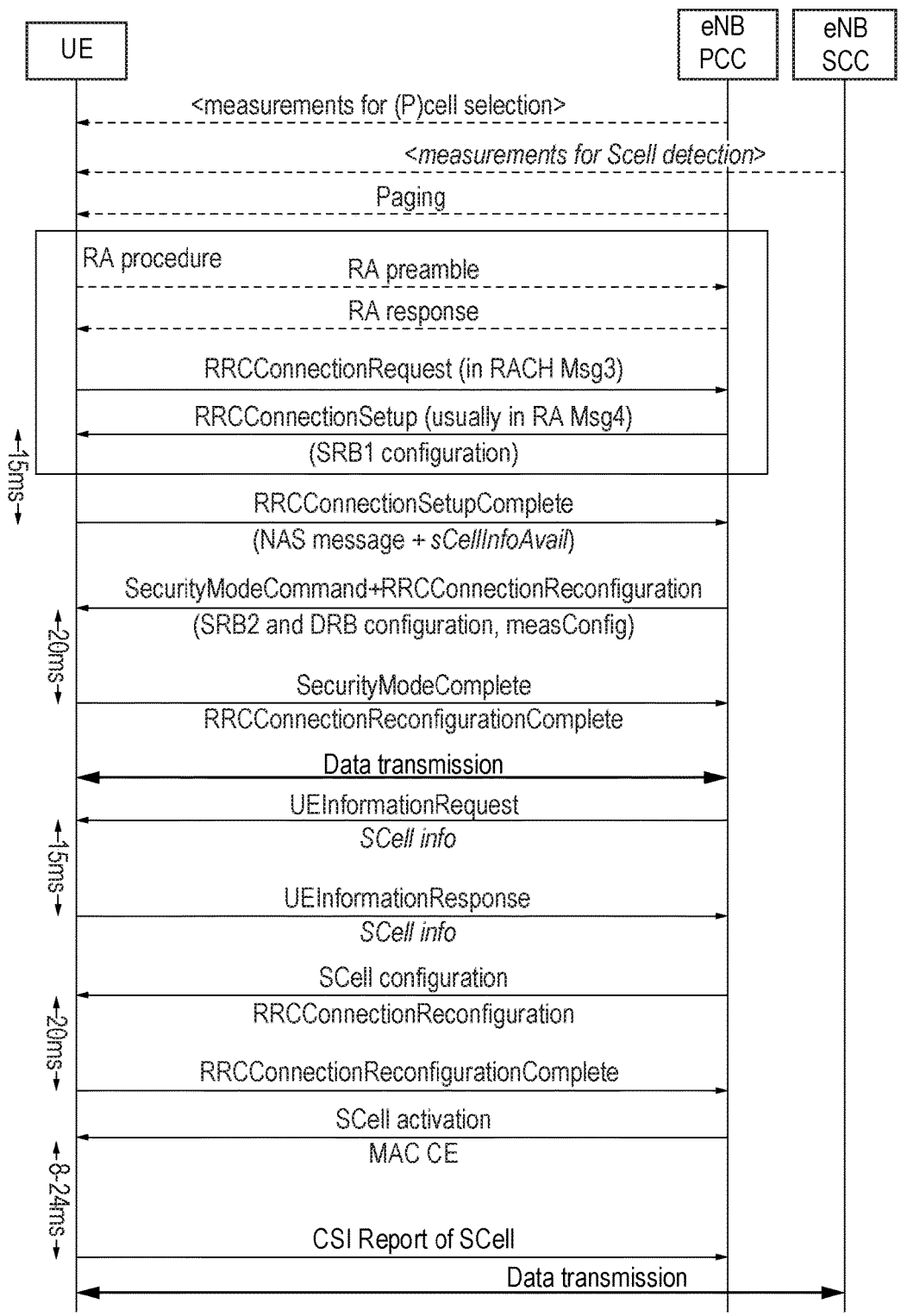
FIG. 5 illustrates another example of a signaling flow diagram, according to another embodiment.

FIG. 5 illustrates another example of a signaling flow diagram, according to another embodiment. According to FIG. 4 discussed above, sCellInfo in that embodiment is sent without encryption. When that is not desirable, FIG. 5 illustrates an embodiment where the RRCConnectionSetupComplete message contains indication 'sCellInfoAvailable' and the eNB may then, after security activation, send UEInformationRequest message to the UE to request UE to send SCellInfo. The UE may respond with UEInformationResponse message including the SCellInfo into the message. According to this embodiment, the major part of the SCell setup delay due to measurements can be avoided since the measurements are carried out during the IDLE mode. The UEInformationRequest and UEInformationResponse, as well as the additional RRCConnectionReconfiguration message, imply some 40-50 ms extra delay compared to the embodiment in FIG. 4, but with this embodiment SCellInfo is sent encrypted over the air.

Figure 6A:
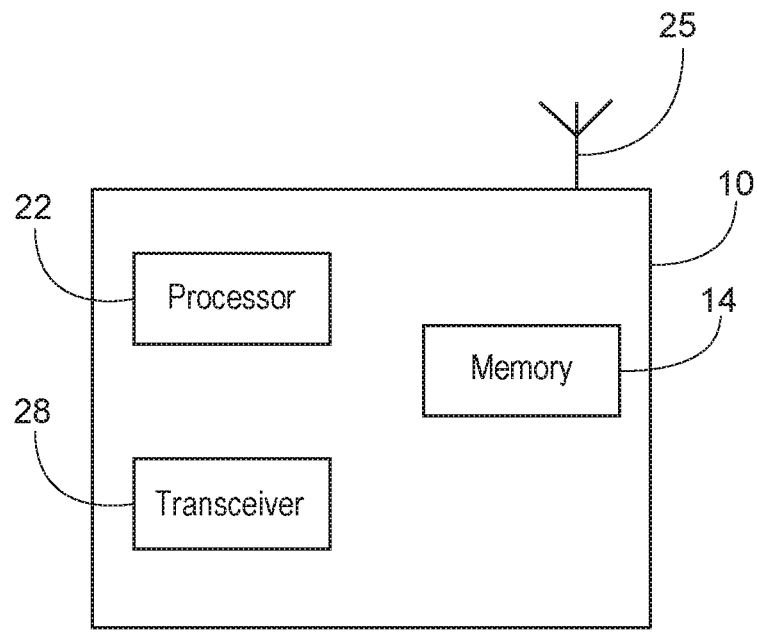
FIG. 6a illustrates a block diagram of an apparatus, according to one embodiment.

FIG. 6a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. It should be noted that one of ordinary skill in the art would understand that apparatus 10 may include components or features not shown in FIG. 6*a*.

As illustrated in FIG. 6*a*, apparatus 10 may include a processor 22 for processing information and executing instructions or operations. Processor 22 may be any type of general or specific purpose processor. While a single processor 22 is shown in FIG. 6*a*, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B, or eNB, or an access node of 5G, for example. According to one embodiment, apparatus 10 may be controlled by memory 14 and processor 22 to perform the functions associated with embodiments described herein. For instance, in one embodiment, apparatus 10 may be controlled by memory 14 and processor 22 to provide an indication, to at least one UE, (or configuring the UE with) of potential inter-frequency carriers that the UE should measure during IDLE mode for potential SCells. More generally, certain embodiments are applicable when the UE is in some non-connected state. In addition to IDLE mode, these states may include for example semi-idle, semi-connected, or suspended state. In certain embodiments, the indication to the UE may be provided over dedicated signaling in a previous RRC connection or may be provided via broadcast signaling (e.g., system information broadcast).

In an embodiment, apparatus 10 may be further controlled by memory 14 and processor 22 to, during or after RRC connection establishment, receive an indication from the at least one UE that it has inter-frequency carrier(s) and/or SCell measurement results available. For example, in one embodiment, apparatus 10 may be further controlled by memory 14 and processor 22 to receive a measurements results report comprising the inter-frequency carrier(s) and/or SCell measurement results. According to an embodiment, the indication from the UE may be received within an establishment message or after the establishment message. In certain embodiments, the received indication may include an implicit reference to existing profiles or an explicit indication of which parameters the UE wants to use. According to some embodiments, the received indication may further include an indication of cell IDs that the UE has been able to identify on the potential inter-frequency carriers. In one embodiment, the received indication may further include reference signal measurements, such as RSRP and/or RSRQ measurement results, for the identified cells.

According to some embodiments, apparatus 10 may be further controlled by memory 14 and processor 22 to, based on the received measurement results, configure carrier aggregation (CA), dual connectivity, multi connectivity, LAA, stand-alone LTE/LTE-like on unlicensed band or LTE-WLAN aggregation without further measurements and activate the SCell. For example, in certain embodiments, the configuring of CA (or dual connectivity, multi connectivity, LAA, stand-alone LTE/LTE-like on unlicensed band or LTE-WLAN aggregation) may further include activating a profile or explicitly signaling the parameters during connection setup.

Figure 6B:
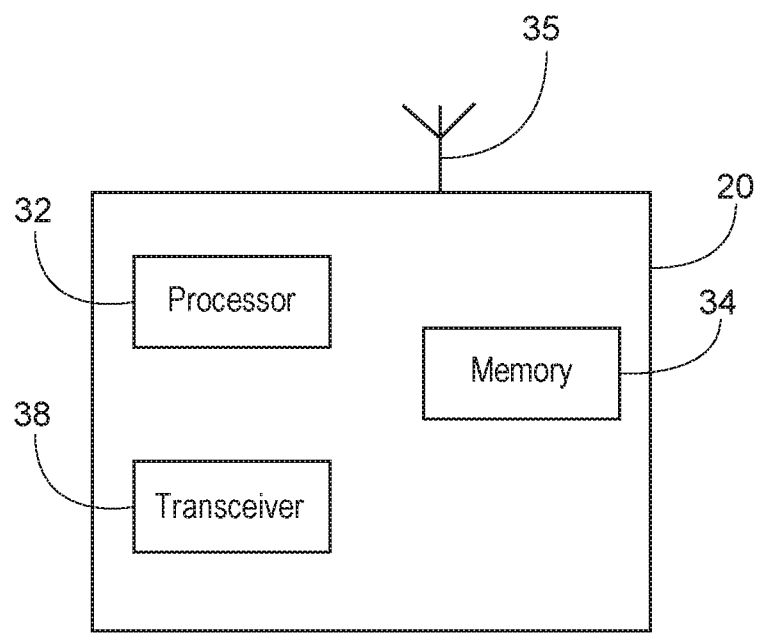
FIG. 6b illustrates a block diagram of an apparatus, according to another embodiment.

FIG. 6*b* illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be UE in LTE, LTE-A, or 5G. It should be noted that one of ordinary skill in the art would understand that apparatus 20 may include components or features not shown in FIG. 6*b*.

As illustrated in FIG. 6*b*, apparatus 20 may include a processor 32 for processing information and executing instructions or operations. Processor 32 may be any type of general or specific purpose processor. While a single processor 32 is shown in FIG. 6*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE. In this embodiment, apparatus 20 may be controlled by memory 34 and processor 32 to perform the functions associated with embodiments described herein. In one embodiment, apparatus 20 may be controlled by memory 34 and processor 32 to receive an indication of potential inter-frequency carriers that the apparatus 20 should measure during IDLE mode (or semi-idle or semi-connected or suspended state) for potential SCells. According to certain embodiments, the indication may be received over dedicated signaling in a previous RRC connection or received via broadcast signaling. During IDLE mode (or semi-idle or semi-connected or suspended state), apparatus 20 may be controlled by memory 34 and processor 32 to measure the potential SCells.

In an embodiment, during or after RRC connection establishment, apparatus 20 may be controlled by memory 34 and processor 32 to send an indication to an eNB that apparatus 20 has inter-frequency carrier(s) and/or SCell measurement results available. For example, in one embodiment, apparatus 20 may be further controlled by memory 34 and processor 32 to send, to the eNB, a measurements results report comprising the inter-frequency carrier(s) and/or SCell measurement results. According to an embodiment, the indication to the eNB may be sent within an establishment message or after the establishment message. In certain embodiments, the indication sent to the eNB may include an implicit reference to existing profiles or an explicit indication of which parameters the apparatus 20 wants to use. According to some embodiments, the indication to the eNB may further include an indication of cell IDs that the apparatus 20 has been able to identify on the potential inter-frequency carriers. In one embodiment, the indication to the eNB may further include reference signal measurements, such as RSRP and/or RSRQ measurement results, for the identified cells.

Figure 7:
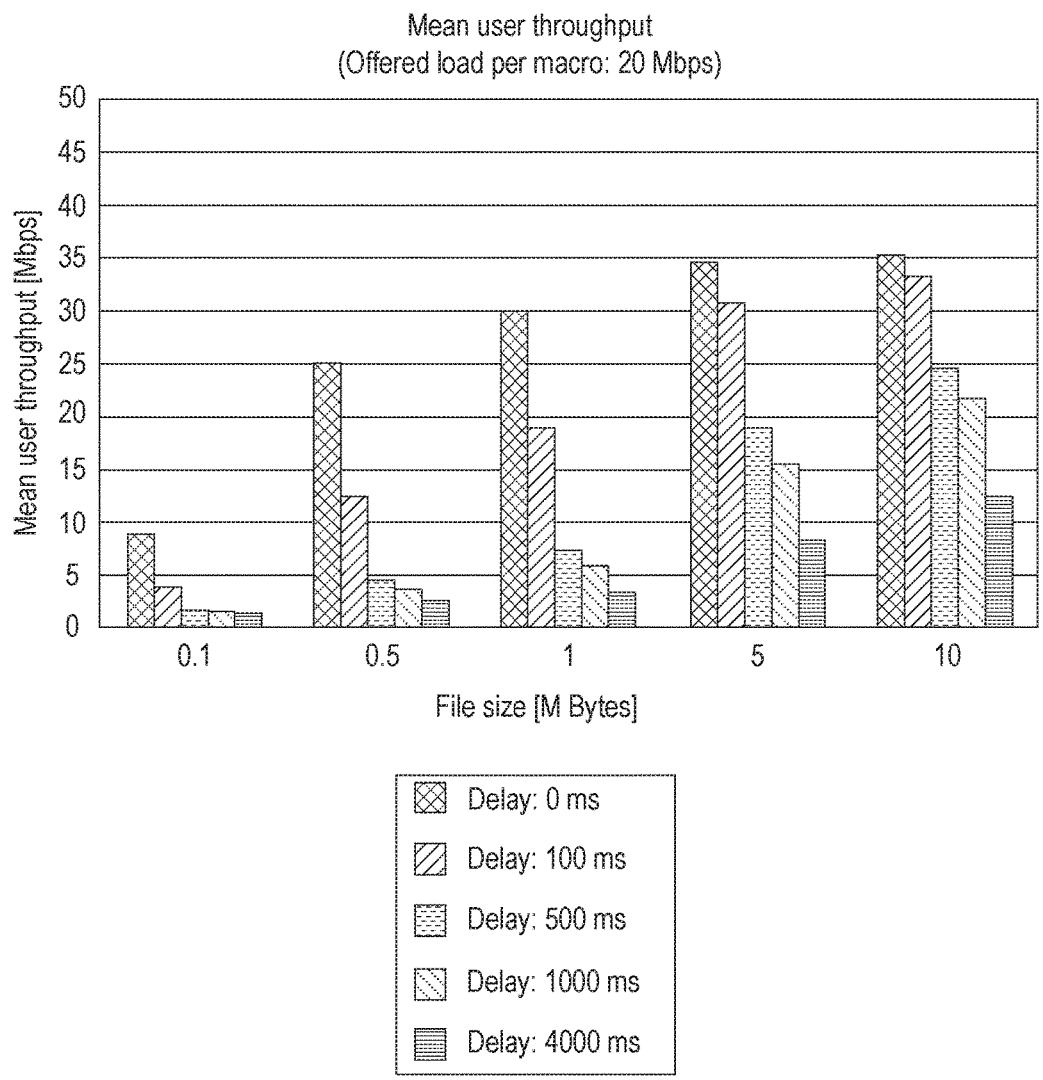
FIG. 7 illustrates a graph depicting simulation results that show the potential performance benefits of certain embodiments of the invention.

FIG. 7 illustrates a graph depicting simulation results that show the potential performance benefits of certain embodiments of the invention. Typical delays between 500 ms to 4000 ms could be reduced by certain embodiments to something in order of 100 ms or less, which translates into substantial performance gain.

Certain embodiments of the invention provide several advantages and/or technical improvements. For example, the use of certain embodiments of the invention can result in improved speed and efficiency, latency reduction and power savings, thereby improving the functioning of communications networks and their nodes.

In some embodiments, the functionality of any of the methods, processes, or flow charts/diagrams described herein may be implemented by software and/or computer program code or portions of it stored in memory or other computer readable or tangible media, and executed by a processor. In some embodiments, an apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine (s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One embodiment is directed to a method, which may be performed by a base station or eNB. The method may include providing an indication, to at least one UE, of (or configuring the UE with) potential inter-frequency carriers that the UE should measure during IDLE mode (or semi-idle or semi-connected or suspended state) for potential SCells. The method may further include during or after RRC connection establishment, receiving an indication from the at least one UE that it has inter-frequency carrier(s) and/or SCell measurement results available, and based on the received measurement results, configuring carrier aggregation (or dual connectivity or multi connectivity or LAA or LTE-WLAN aggregation) without further measurements and activating the SCell.

Another embodiment is directed to an apparatus, which may include at least one processor and at least one memory including computer program code. The at least one memory and the computer program code may be configured, with the at least one processor, to cause the apparatus at least to provide an indication, to at least one UE, of (or configuring the UE with) potential inter-frequency carriers that the UE should measure during IDLE mode (or semi-idle or semi-connected or suspended state) for potential SCells. The apparatus may be further caused to, during or after RRC connection establishment, receive an indication from the at least one UE that it has inter-frequency carrier(s) and/or SCell measurement results available, and based on the received measurement results, to configure carrier aggregation (or dual connectivity or multi connectivity or standalone LTE or LAA or LTE-WLAN aggregation) without further measurements and to activate the SCell.

Another embodiment is directed to a method, which may be performed by a UE. The method may include receiving an indication, at a UE, of potential inter-frequency carriers that the UE should measure during IDLE mode (or semi-idle or semi-connected or suspended state) for potential SCells. The method may then include, during IDLE mode (or semi-idle or semi-connected or suspended state), measuring the potential SCells and, during or after RRC connection establishment, sending an indication to an eNB that the UE has inter-frequency carrier(s) and/or SCell measurement results available.

Another embodiment is directed to an apparatus, which may include at least one processor and at least one memory including computer program code. The at least one memory and the computer program code may be configured, with the at least one processor, to cause the apparatus at least to receive an indication, from an eNB, of potential inter-frequency carriers that the apparatus should measure during IDLE mode (or semi-idle or semi-connected or suspended state) for potential SCells. The apparatus may be further controlled to, during IDLE mode (or semi-idle or semi-connected or suspended state), measure the potential SCells and, during or after RRC connection establishment, to send an indication to the eNB that the apparatus has inter-frequency carrier(s) and/or SCell measurement results available.

It should be noted that, while certain embodiments have been described herein with respect to carrier aggregation, other embodiments are equally applicable to other scenarios, such as dual connectivity, multi connectivity, LAA, standalone LTE/LTE-like on unlicensed band, or LTE-WLAN aggregation, etc. Also, it should be noted that certain embodiments of the invention are not limited to the case where a UE is moving from IDLE to RRC connected state. For example, some embodiments may also be applied in the case there is another state for example between IDLE and connected states, such as for instance a semi-idle or semi-connected state or a suspended state, where the connection is not released but is suspended.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

SUMMARY

In a first aspect thereof the exemplary embodiments of this invention provide an apparatus that comprises at least one data processor and at least one memory that includes computer program code. The at least one memory and computer program code are configured, with the at least one data processor, to cause the apparatus, at least to transmit a carrier aggregation profile to at least one user equipment wherein the profile comprises an indication of at least one of inter-frequency carrier and secondary cell that the user equipment is to measure during an idle mode; receive, from the at least one user equipment, an indication that it has measurement results available for at least one of inter-frequency carrier and secondary cell in the profile; and configure, for the at least one user equipment, carrier aggregation based on the received measurement results without further measurement configuration after connection establishment.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive, from a base station, a carrier aggregation profile which comprises an indication of at least one of inter-frequency carrier and secondary cell that the apparatus is to measure during an idle mode; measure, by the apparatus, the at least one of inter-frequency carrier and secondary cell during the idle mode; and transmit, by the apparatus, an indication to the base station that the apparatus has measurement results available for at least one of inter-frequency carrier and secondary cell in the profile.

In another aspect thereof the exemplary embodiments of this invention provide a method that comprises receiving, from a base station, a carrier aggregation profile which comprises an indication of at least one of inter-frequency carrier and secondary cell that a user equipment is to measure during an idle mode; measuring, by the user equipment, the at least one of inter-frequency carrier and secondary cell during the idle mode; and transmitting, by the user equipment, an indication to the base station that the use equipment has measurement results available for at least one of inter-frequency carrier and secondary cell in the profile.

What is claimed is:

1. An apparatus, comprising:
    at least one data processor; and
    at least one memory including computer program code, where the at least one memory and computer program code are configured, with the at least one data processor, to cause the apparatus at least to:
    transmit, by the apparatus, a carrier aggregation profile to at least one user equipment wherein the profile comprises an indication of at least one of inter-frequency carrier and secondary cell that the user equipment is to measure during an idle mode;
    receive, from the at least one user equipment, an indication that it has measurement results available for at least one of inter-frequency carrier and secondary cell in the profile; and
    configure, for the at least one user equipment, carrier aggregation based on the received measurement results without further measurement configuration after connection establishment.

2. The apparatus as in claim 1, wherein the carrier aggregation profile is transmitted in a connection setup message.

3. The apparatus as in claim 1, wherein the carrier aggregation profile is pre-configured to the user equipment prior to connection establishment via dedicated signaling during previous radio resource connection or pre-configured via broadcast signaling.

4. The apparatus as in claim 1, wherein the carrier aggregation is configured for one of dual connectivity, multi connectivity, licensed assisted access, stand-alone LTE/LTE-like on unlicensed band, and LTE-WLAN aggregation.

5. The apparatus as in claim 1, wherein the idle mode further comprises semi-idle mode, semi-connected state, and suspended state wherein radio resource connection is suspended not released.

6. The apparatus as in claim 1, wherein the indication that the user equipment has measurement results available is received during or after radio resource connection establishment.

7. A method comprising:
    receiving, from a base station, a carrier aggregation profile which comprises an indication of at least one of inter-frequency carrier and secondary cell that a user equipment is to measure during an idle mode;
    measuring, by the user equipment, the at least one of inter-frequency carrier and secondary cell during the idle mode; and
    transmitting, by the user equipment, an indication to the base station that the user equipment has measurement results available for at least one of inter-frequency carrier and secondary cell in the profile.

8. The method as in claim 7, wherein the carrier aggregation profile is received in a connection setup message.

9. The method as in claim 7, wherein the carrier aggregation profile is pre-configured to the user equipment prior to connection establishment via dedicated signaling during previous radio resource connection or pre-configured via broadcast signaling.

10. The method as in claim 7, wherein the carrier aggregation is configured for one of dual connectivity, multi connectivity, licensed assisted access, stand-alone LTE/LTE-like on unlicensed band, and LTE-WLAN aggregation.

11. The method as in claim 7, wherein the idle mode further comprises semi-idle mode, semi-connected state, and suspended state wherein radio resource connection is suspended not released.

12. The method as in claim 7, wherein the indication that the user equipment has measurement results available is transmitted during or after radio resource connection establishment.

13. The method as in claim 7, wherein the indication that the user equipment has measurement results available is an implicit reference to the carrier aggregation profiles or an explicit indication of which inter-frequency carrier and/or secondary cell the user equipment wishes to use.

14. An apparatus, comprising:
    at least one data processor; and
    at least one memory including computer program code, where the at least one memory and computer program code are configured, with the at least one data processor, to cause the apparatus to:
    receive, from a base station, a carrier aggregation profile which comprises an indication of at least one of inter-frequency carrier and secondary cell that the apparatus is to measure during an idle mode;
    measure, by the apparatus, the at least one of inter-frequency carrier and secondary cell during the idle mode; and
    transmit, by the apparatus, an indication to the base station that the apparatus has measurement results available for at least one of inter-frequency carrier and secondary cell in the profile.

15. The apparatus as in claim 14, wherein the indication of at least one of inter-frequency carrier and secondary cell is received in a connection setup message.

16. The apparatus as in claim 14, wherein the indication of at least one of inter-frequency carrier and secondary cell is pre-configured to the user equipment prior to connection establishment via dedicated signaling during previous radio resource connection or pre-configured via broadcast signaling.

17. The apparatus as in claim 14, wherein the carrier aggregation is configured for one of dual connectivity, multi connectivity, licensed assisted access, stand-alone LTE/LTE-like on unlicensed band, and LTE-WLAN aggregation.

18. The apparatus as in claim 14, wherein the idle mode further comprises semi-idle mode, semi-connected state, and suspended state wherein radio resource connection is suspended not released.

19. The apparatus as in claim 14, wherein the indication that the apparatus has measurement results available is transmitted during or after radio resource connection establishment.

20. The apparatus as in claim 14, wherein the indication that the apparatus has measurement results available is an implicit reference to the carrier aggregation profiles or an explicit indication of which inter-frequency carrier and/or secondary cell the user equipment wishes to use.

* * * * *